(12) United States Patent
De Vuyst et al.

(10) Patent No.: US 7,323,199 B2
(45) Date of Patent: Jan. 29, 2008

(54) METHOD FOR THE PREPARATION OF YOGHURT AND OTHER FERMENTED MILK PRODUCTS

(75) Inventors: Luc De Vuyst, Erembodegem (BE); Bart Degeest, Ghent (BE)

(73) Assignee: Vrije Universiteit Brussel, Brussels (BE)

( * ) Notice: Subject to any disclaimer, the term of this patent is extended or adjusted under 35 U.S.C. 154(b) by 0 days.

(21) Appl. No.: 10/296,732

(22) PCT Filed: Jun. 14, 2001

(86) PCT No.: PCT/BE01/00099

§ 371 (c)(1),
(2), (4) Date: Nov. 25, 2002

(87) PCT Pub. No.: WO01/95736

PCT Pub. Date: Dec. 20, 2001

(65) Prior Publication Data

US 2003/0152665 A1  Aug. 14, 2003

Related U.S. Application Data

(60) Provisional application No. 60/211,619, filed on Jun. 14, 2000.

(51) Int. Cl.
*A23C 9/12* (2006.01)
(52) U.S. Cl. .................. 426/34; 426/42; 426/580; 426/583
(58) Field of Classification Search ............... 426/34, 426/36, 42, 43, 580, 582, 583
See application file for complete search history.

(56) References Cited

U.S. PATENT DOCUMENTS 4,965,079 A * 10/1990 Hose et al. ................ 426/43
5,382,438 A    1/1995 Hottinger et al.

FOREIGN PATENT DOCUMENTS

| DE | 1 692 386 | 7/1971 |
| EP | 000359295 B1 * | 3/1990 |
| EP | 000575010 A1 * | 12/1993 |
| WO | WO 93/16600 | 9/1993 |

OTHER PUBLICATIONS

Hess et al., 1997 J. Dairy Sci. 80:252-263.*
Beal et al., 1999 J. Dairy Sci. 82:673-681.*

J. G. Davis, "Standards for Yogurt", Aug. 1971, Dairy Industries, pp. 456-462.

Cerning, J., et al., "Exopolysaccharides produced by the dairy lactic acid bacteria", Recent Res. Devel. Microbiology, 3(1999):195-209.

Beal, C. et al., "Combined Effect of Culture Conditions and Storage Time on Acidification and Viscosity of Stirred Yogurt", J. Dairy Sci, vol. 82, No. 4, 1999, pp. 673-682.

Larsen, Raul F., et al., "Effect of Water Activity of Milk upon Growth and Acid Production by Mixed Cultures of *Streptococcus thermophilus* and *Lactobacillus bulgaricus*", Journal of Food Science, vol. 55, No. 3, 1990, pp. 708-710.

De Vuyst, Luc, et al., "Heteropolysaccharides from lactic acid bacteria", FEMS Microbiology Reviews 23 (1999), pp. 159-177.

De Vuyst, L., et al., "Production by and isolation of exopolysaccharides from *Streptococcus thermophilus* grown in milk medium and evidence for their growth-associated biosynthesis", Journal of Applied Microbiology 1998, 84, pp. 1059-1068.

Begeeset, Bart, et al., "Indication that the Nitrogen Source Influences Both Amount and Size of Exopolysaccharides Produced by *Streptococcus thermophilus* LY03 and Modelling of the Bacterial Growth and Exopolysaccharide Production in a Complex Medium", Applied and Environmental Microbiology, Jul. 1999, p. 2863-2870.

Rohm, H., "Influence of dry matter fortification on flow properties of yogurt", Milchwissenschaft 48 (11) 1993, pp. 614-617.

Marshall, Valerie M., "Effects of exopolysaccharide-producing strains of thermophilic lactic acid bacteria on the texture of stirred yoghurt", International Journal of Food Science and Technology, 1999, 34, pp. 137-143.

Ricciardi, A., et al., "Exopolysaccharides from lactic acid bacteria: structure, production and technological applications", Ital, J. Food Sci., n. 1, vol. 12-2000, pp. 23-45.

Larsen, Raul F., et al., "Effect of water Activity $a_w$ of Milk on acid Production by *Streptococcus thermophilus* and *Lactobacillus bulgaricus*", Journal of Food Science, vol. 54, No. 4, 1989, pp. 917-921.

* cited by examiner

*Primary Examiner*—Leslie Wong
(74) *Attorney, Agent, or Firm*—Merchant & Gould P.C.

(57) ABSTRACT

The present invention relates to a method for the production of yoghurt or other fermented milk products, comprising the following steps: inoculation of a starter medium with a starter culture, said starter culture comprising an exopolysaccharide-producing micro-organism. An exopolysaccharide production step wherein the pH of said starter medium is kept stable at a predetermined pH value at a suitable temperature, and an acidification step to allow clotting of the starter medium.

17 Claims, 4 Drawing Sheets

METHOD FOR THE PREPARATION OF YOGHURT AND OTHER FERMENTED MILK PRODUCTS

This application is a 371 of PCT/BE01/00099 filed Jun. 14, 2001 which claims benefit of U.S. 60/211,619 filed Jun. 14, 2000.

FIELD OF THE INVENTION

The present invention is related to the a preparation method for yoghurt and other fermented milk products. It is in particular related to a novel preparation method for yoghurt and other fermented milk products resulting in a more stable product.

STATE OF THE ART

Fermented milk products are obtained by incubating milk or a raw material derived from milk with particular micro-organisms such as lactic acid bacteria. The raw material is often cow's milk, but the milk of other animals such as buffalos, horses, sheep or goats can also be used, as can cream or whey. The milk may be whole milk, but also partially or completely skimmed milk. Traditionally, yoghurt is produced by inoculation of milk with *Lactobacillus delbrueckii* subsp. *bulgaricus* and *Streptococcus thermophilus* as starter cultures. It is a traditional method to preserve milk through acidification (Davis, 1971; Marth & Steele, 1998). Two basic types of yoghurt exist, according to its physical state in the retail container: set yoghurt and stirred yoghurt. Set yoghurt is fermented after being packed in a retail container, and stirred yoghurt is almost fully fermented in a fermentation tank before it is packed, the yoghurt gel being broken up during the stirring (Walstra et al., 1999). Both types of yoghurt undergo the phenomenon of water separation (syneresis).

Set yoghurt often undergoes syneresis during storage. To obtain the necessary viscosity and texture, the milk is fortified with milk solids through the addition of defatted milk powder, whey powder, caseinate, etc. (Rohm, 1993). However, this method goes hand in hand with extra costs. Furthermore, high concentrations of total solids added to the milk before fermentation may result in conditions inhibitory to bacterial growth, leading to long fermentation times and poor acid development. This may be due to both adverse osmotic effects of the solutes in milk and a low water activity (Larsen & Añon, 1989, 1990). On the other hand, non-concentrated milk may be used as well, but the yoghurt obtained is less firm and more prone to syneresis. Alternative technologies include prefermentation processing like the concentration of milk (by evaporation under vacuum, membrane filtration, etc.), heat treatment of the milk prior to inoculation, and homogenization, as well as modified incubation conditions, and handling of the ripened coagulum (De Vuyst & Degeest, 1999; Beal et al., 1999; Walstra et al., 1999). Stirred yoghurt is virtually always made from non-concentrated milk. After gelation, it is gently stirred to obtain a smooth and fairly thick, but still pourable, product. The rate of acidification, influencing gelation, differs between set and stirred yoghurt. When making stirred yoghurt, gelation begins at about the same pH as observed for the gelation of set yoghurt (4.7), but it takes a longer time before the gel has become sufficiently firm for the stirring to be started (Walstra et al., 1999). Syneresis takes place during fermentation. One of the measures frequently used for product stability and improved thickening is the addition of stabilizers or texturizers (chemically modified starch, carrageenan, guar gum, pectin, gelatin, etc.). However, those food additives may adversely affect the true taste and aroma of yoghurt. In addition, the use of those hydrocolloids results in a non-natural image, and it is not allowed in all countries. Hence, in the latter case yoghurt manufacturers have to make use of the technologies mentioned above to guarantee an acceptable texture of the end-products (De Vuyst & Degeest, 1999).

The use of yoghurt starter cultures that contain strains that produce exopolysaccharides (*S. thermophilus*, *Lb. delbrueckii* subsp. *bulgaricus* or both) is a promising alternative (Cerning & Marshall, 1999; De Vuyst & Degeest, 1999; Marshall & Rawson, 1999; Ricciardi & Clementi, 2000). Exopolysaccharides from yoghurt bacteria are microbial polysaccharides, intracelluarly synthesized and extracellulary secreted, which may function as texture-forming constituents (De Vuyst & Degeest, 1999). Exopolysaccharides that are produced in situ, i.e. through inoculation of milk with a yoghurt starter culture that contains exopolysaccharide-producing strains, have the capacity to retain water and hence avoid syneresis, to improve the viscosity and hence guarantee a good final texture, and to replace fat without affecting the mouth feel when the yoghurt is eaten (De Vuyst & Degeest, 1999; Marshall & Rawson, 1999). However, exopolysaccharide production in milk by thermophilic lactic acid bacteria such as *Streptococcus thermophilus* is low and unstable when carried out using the traditional batch process technologies for the production of yoghurt (De Vuyst & Degeest, 1999).

The inventors have shown that exopolysaccharide production by *Streptococcus thermophilus* is strongly dependent on the temperature and pH conditions of the fermentation medium (De Vuyst et al., 1998). *S. thermophilus* LMG P-19262 produces two exopolysaccharides of different size, a high-molecular-mass and a low-molecular-mass exopolysaccharide, but with the same monomeric composition, i.e. glucose, galactose, and N-acetylgalactosamine (De Vuyst et al., 1998; Degeest & De Vuyst, 1999). Under non-optimal conditions, exopolysaccharide production in milk is low and unstable (De Vuyst et al., 1998). Optimal conditions of temperature (42° C.) and controlled pH (6.2) allow maximum production of exopolysaccharides by *S. thermophilus* LMG P-19262 in both milk and MRS media (De Vuyst et al., 1998). However, the exopolysaccharides produced are unstable upon prolonged fermentation (De Vuyst et al., 1998; Degeest & De Vuyst, 1999).

AIMS OF THE INVENTION

The present invention aims to provide a yoghurt or other fermented milk product which has an acceptable viscosity and texture, which can retain water and does not show excessive syneresis.

A further aim is to provide a method for obtaining such a yoghurt or other fermented milk products having the above mentioned qualities.

SUMMARY OF THE INVENTION

The present invention concerns a preparation method for yoghurt or other fermented milk products, comprising the following steps:

Inoculation of a starter medium with a starter culture, said starter culture comprising an exopolysaccharide-producing micro-organism, An exopolysaccharide production step wherein the pH of said starter medium is kept stable at a predetermined pH value at a suitable temperature, and An acidification step to allow clotting of the starter medium.

Preferably, said predetermined pH value lies between about 4.0 and about 7.0, and even more preferably between about 5.5 and about 6.5. Said suitable temperature lies preferably between about 15 and about 50° C., and more preferably between about 37 and about 44° C.

Advantageously, said predetermined pH value is 6.2 and said suitable temperature is 42° C.

In a specific embodiment, said acidification step comprises termination of the pH control, followed by a spontaneous acidification.

In an alternative embodiment, said acidification step is performed by addition of a food grade acid.

Said starter culture can comprises a microorganism selected from the group consisting of any exopolysaccharide-producing *S. thermophilus*, *Lb. delbrueckii* subsp. *bulgaricus*, thermophilic lactic acid bacterium (such as *Lb. delbrueckii*, *Lb. acidophilus*, *Lb. helveticus*, . . . ), *Lactococcus lactis*, or mesophilic lactic acid bacterium strain (such as *Lb. casei*, *Lb. sakei*, *Lb. rhamnosus*, . . . ) or any combination or mutant or recombinant thereof.

Advantageously, said starter culture comprises the strain *S. thermophilus* LMG P-19262.

Preferably said starter medium is milk.

A second aspect of the present invention is a yoghurt or fermented milk product obtainable by the method according to the invention as mentioned above.

Said product preferably has a high and stable exopolysaccharide content and a high viscosity.

DETAILED DESCRIPTION OF THE INVENTION

Figure 1:
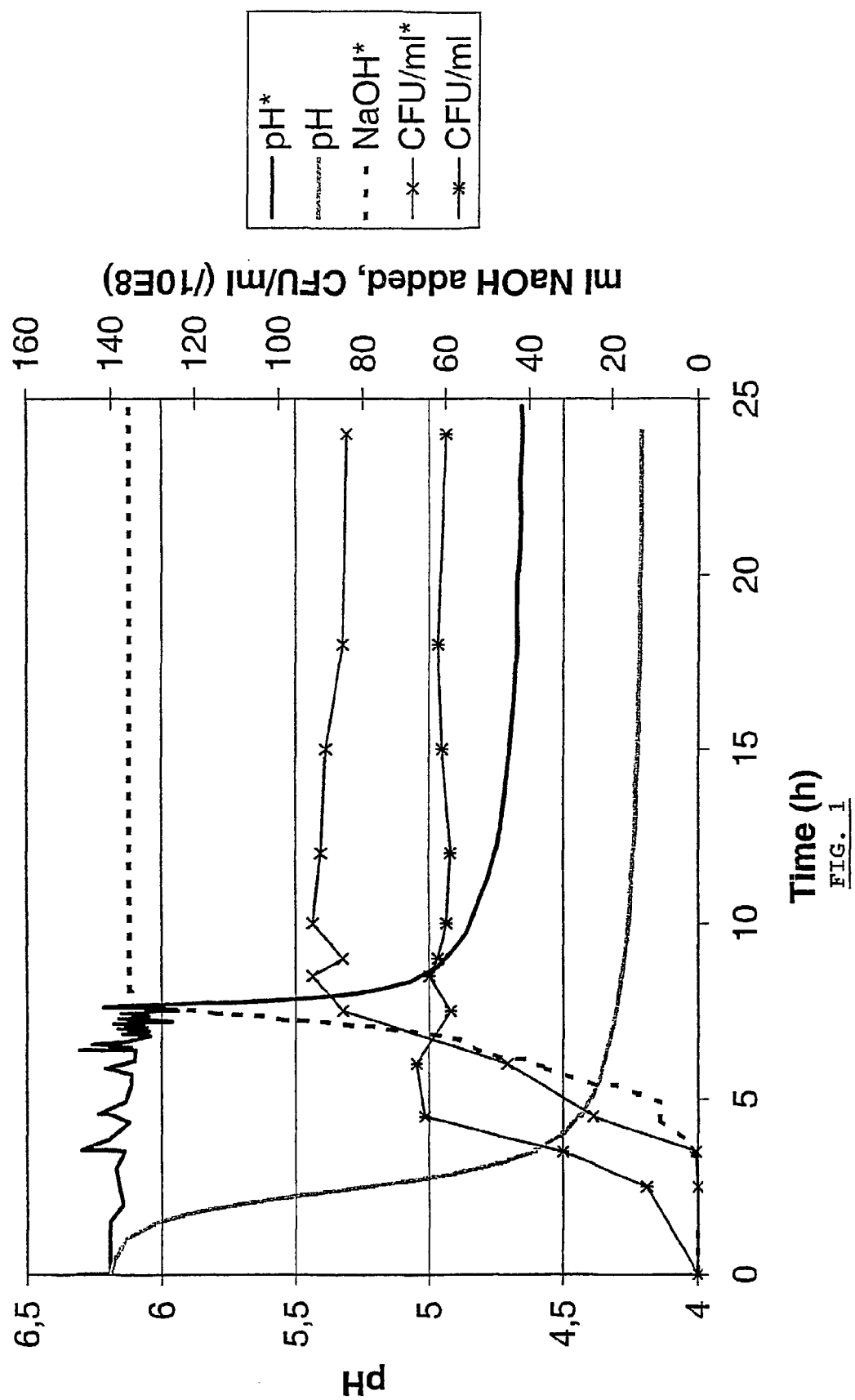
FIG. 1 represents a fermentation profile of the exopolysaccharide-producing *Streptococcus thermophilus* LMG P-19262 strain in enriched milk medium using a two-step and a classical (one-step) fermentation strategy.

This invention deals with a new process technology for yoghurt production with an exopolysaccharide-producing starter culture, namely a two-step process including an exopolysaccharide production step and an acidification step.

To avoid a low and unstable exopolysaccharide production, and to maximally exploit the exopolysaccharide production capacity of the yoghurt starter strain, the following new, two-step, process technology for yoghurt production was invented:

1) A first step or exopolysaccharide production step: inoculation of the milk with the yoghurt starter culture including an exopolysaccharide-producing *S. thermophilus* strain and on line control of the pH of the fermentation medium at a fixed value situated between 5.5-6.5 and of the temperature at 37-44° C. Usual agents as sodium hydroxide, ammonium hydroxide, calcium hydroxide, potassium hydroxide, sodium carbonate, calcium carbonate, etc. can be used for maintaining the set pH value.

2) An acidification step to allow clotting of the milk and improve aroma and taste formation. Acidification can take place either spontaneously through prolonged fermentation or by the addition of an acidifying agent. The acidification contributes to the stability of the exopolysaccharides produced during the first process step.

Laboratory Fermentation Strategy

During a laboratory experiment, a 10 l fermentor with enriched milk medium (10.0% (m/v) skimmed milk powder, 1.0% (m/v) peptone, 0.5% (m/v) yeast extract) was inoculated with 1.0% (v/v) of a freshly grown culture of *S. thermophilus* LMG P-19262. The milk was sterilised in situ by heating according to the following profile: heating of the milk at 95° C. during 20 min, cooling down to 20° C. and keeping it at 20° C. for 1 h, and then another heating step of 95° C. during 20 min, after which the milk was cooled down to the fermentation temperature of 42° C. The peptone and yeast extract was sterilised separately (20 min at 121° C.) and aseptically added to the fermentor. Optimised fermentation conditions for maximum exopolysaccharide production were applied, i.e. a temperature of 42° C. and an agitation rate of 100 rpm (to keep the fermentation broth homogenous). The pH was kept constant at pH 6.2 through on line control by automatic addition of 10 N NaOH.

Bacterial growth was followed by on line registration of the amount of NaOH required to neutralize the lactic acid accumulated in the fermentation broth and was hence also a measure of the amount of lactose consumed. Also cell numbers were determined to follow the course of living cells. After 7.5 h of growth, 135 ml of NaOH was added, indicating that approximately 50.0% of the lactose present in the fermentation medium was consumed. At this stage, pH control was switched off and the second step of the process (the acidification step) started. The pH drop was followed on line. The fermentation was stopped after 24 h when a final pH of 4.6 was reached.

The same fermentation strategy was also applied to perform a two-step fermentation process in milk without peptone and yeast extract.

During all fermentations, samples of 550 ml were taken at regular time intervals to determine the cell number, the amount of exopolysaccharides, and the viscosity of the fermentation broth. For all fermentations, the maximum specific growth rate and maximum acidification rate were estimated by linear regression from the plots of in CFU/ml versus time and in pH versus time, respectively.

Laboratory Control Fermentation

As a control fermentation, the same experiment was done without the first, pH-controlled process step. A 10 l fermentor with sterilised enriched milk (see above) was inoculated with 1.0 v (v/v) of a freshly grown culture of *S. thermophilus* P-19262, and run at a controlled temperature of 42° C. and an agitation rate of 100 rpm (to keep the fermentation broth homogenous), but without pH-control. The pH was measured on line. The fermentation was stopped after 24 h when a final pH of 4.2 was reached.

The same fermentation strategy was also applied to perform a control fermentation in milk without peptone and yeast extract.

During all fermentations, samples of 550 ml were taken at regular time intervals to determine the cell number, the amount of exopolysaccharides, and the viscosity of the fermentation broth. For all fermentations, the maximum specific growth rate and maximum acidification rate were estimated by linear regression (see above).

Analysis of Samples

Cell numbers (CFU.ml$^{-1}$) were determined by plate counting on solid LAPT (yeast extract, 10 g.l$^{-1}$; peptone, 15 g.l$^{-1}$; tryptone, 10 g.l$^{-1}$; Tween 80, 1 ml.l$^{-1}$; glucose, 10 g.l$^{-1}$; agar, 20 g.l$^{-1}$).

Isolation and Quantification of Exopolysaccharides (De Vuyst et al., 1998)

Isolation of exopolysaccharides was carried out using 500 ml of milk medium in four consecutive steps. First, (milk) proteins were removed from the fermentation liquor by precipitation with one volume of 20% trichloroacetic acid (TCA), followed by centrifugation of cells and proteins (25000×g, 20 min, 4° C.). Second, exopolysaccharides were precipitated overnight with an isovolume of chilled aceton, followed by centrifugation of the precipitate (25000×g, 30 min, 4° C.), after which the pellet was redissolved in ultrapure water. Third, residual proteinaceous material was precipitated with TCA and removed by centrifugation as described above. Fourth, the exopolysaccharides were finally isolated by chilled aceton precipitation (one volume) and harvested. The exopolysaccharides were redissolved in ultrapure water, washed with aceton and then dried to determine the polymer dry mass (PDM).

Determination of Apparent Viscosity

Apparent viscosity measurements were carried out on 0.5 ml samples, using a cone-plate Brookfield Digital Rheometer Model DV III (Brookfield Engineering Laboratories Inc., Stoughton, Mass., USA) equipped with a flat spindle, type CP 40, rotating in a sample-containing chamber connected to a temperature controlled cryostat water bath. The rheometer was steered by the Brookfield Rheocalc software (Brookfield Engineerling Laboratories, Inc.).

To perform the apparent viscosity measurements of the fermentation samples, spindle speeds of 50 rpm were used during 45 s. The spindle speed of 50 rpm was chosen because the torque to rotate the spindle in the fluid was then between 10.0% and 90.0%. It corresponded with a shear rate of 375/s. Values out of this range were not valid and lead to misinterpretation of the results. The measurements were done at a constant temperature of 42° C. Values were expressed in mpa·s.

Results

Figure 2:
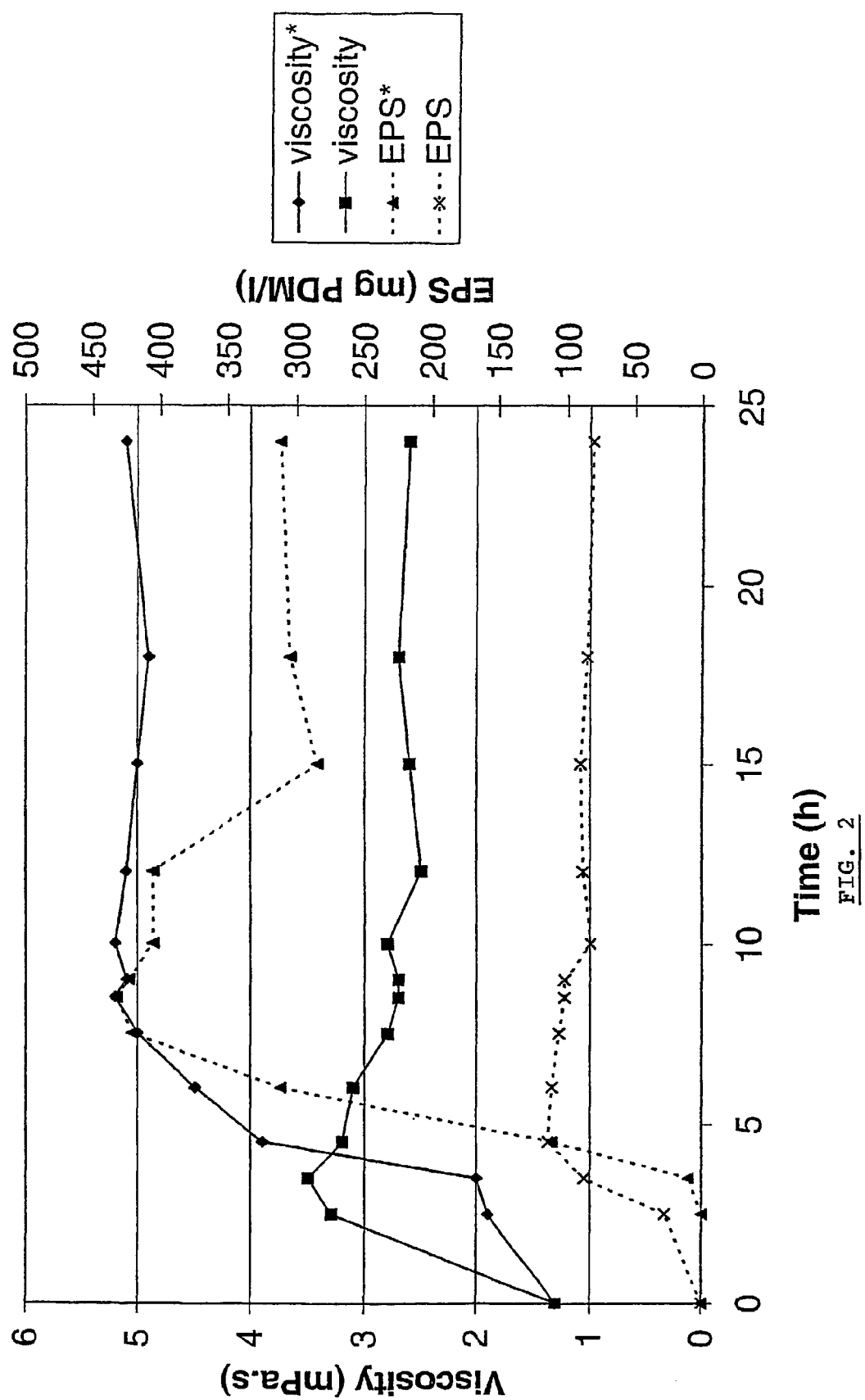
FIG. 2 shows a fermentation profile of *Streptococcus thermophilus* LMG P-19262 in enriched milk medium using a two-step and a classical (one-step) fermentation strategy.

The results of the fermentation profile of both the two-step fermentation process and of the control fermentation, carried out in enriched milk medium, are represented in FIG. 1 (course of pH and living cell numbers) and FIG. 2 (course of EPS and apparent viscosity).

FIG. 1 represents a fermentation profile of the exopolysaccharide-producing *Streptococcus thermophilus* LMG P-19262 strain in enriched milk medium using a two-step and a classical (one-step) fermentation strategy. The fermentations were carried out at a constant temperature of 42° C. and a constant agitation rate of 100 rpm. The pH of the first step of the two-step fermentation process was kept constant at 6.2 through automatic addition of 10 N NaOH. Values of pH, cell number (CFU.ml$^{-1}$) and added NaOH (ml.l$^{-1}$) are displayed. All values linked to the two-step fermentation process are marked with '*'. The vertical line indicates the switch between the first and the second step.

FIG. 2 shows a fermentation profile of *Streptococcus thermophilus* LMG P-19262 in enriched milk medium using a two-step and a classical (one-step) fermentation strategy. The fermentation was carried out at a constant temperature of 42° C. and a constant agitation rate of 100 rpm. Values of apparent viscosity (mPa·s) and amount of EPS (mg PDM.l$^{-1}$) are displayed. All values linked to the two-step fermentation process are marked with '*'. The vertical line indicates the switch between the first (pH-controlled) and the second (acidification) step.

Figure 3:
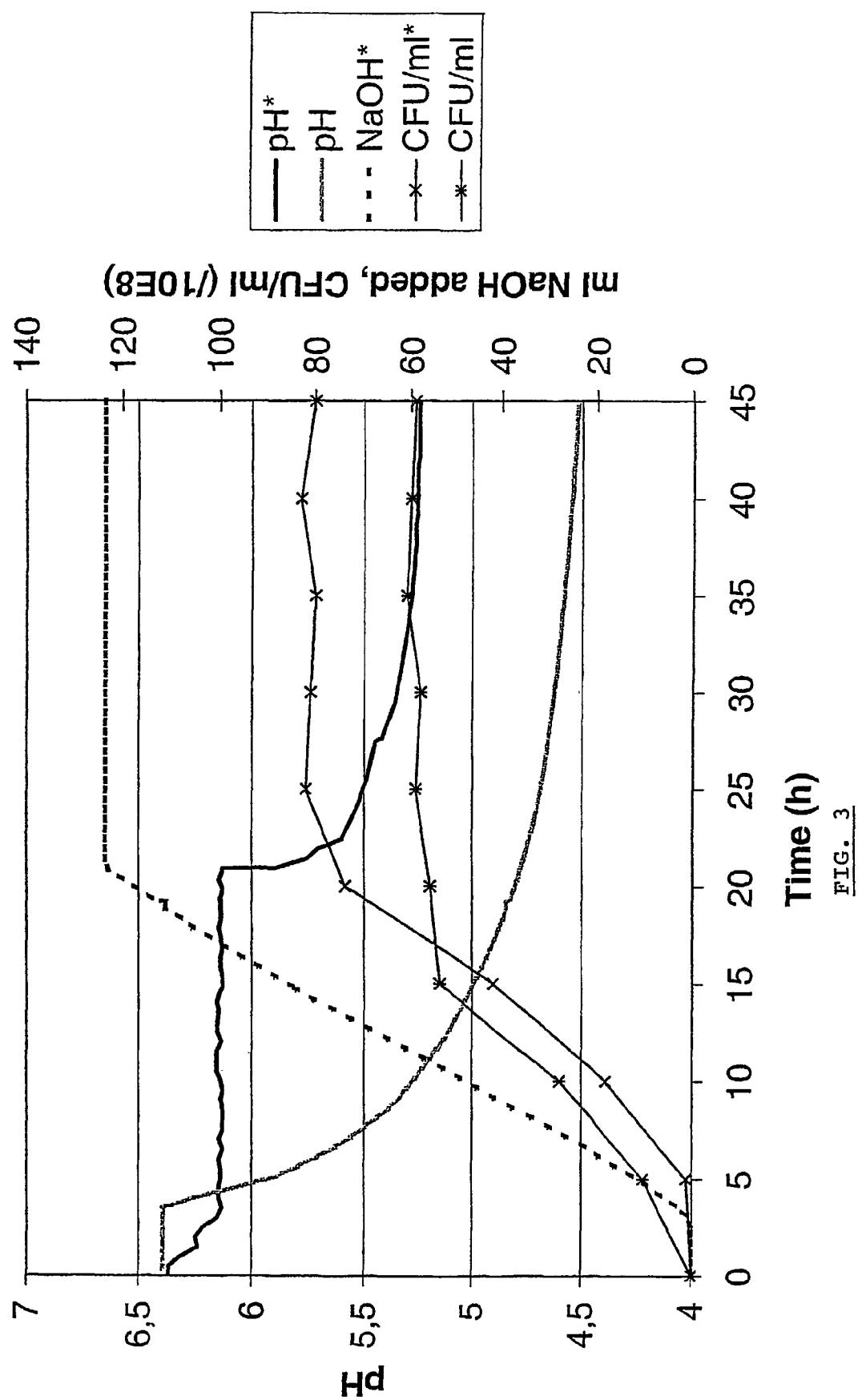
FIG. 3 is a fermentation profile of *Streptococcus thermophilus* LMG P-19262 in unsupplemented milk medium using a two-step and a classical (one-step) fermentation strategy.
Figure 4:
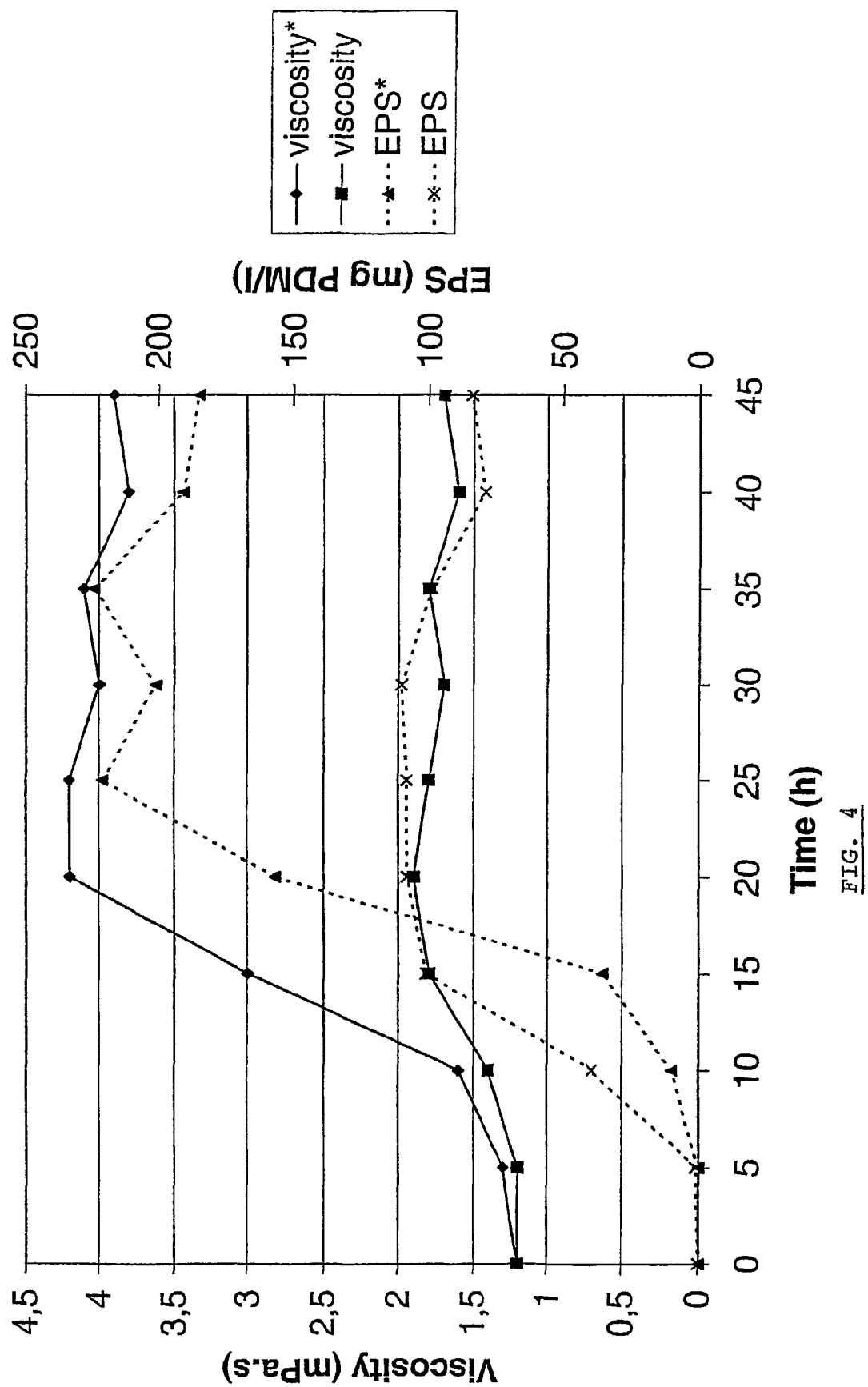
FIG. 4 depicts a fermentation profile of *Streptococcus thermophilus* LMG P-19262 in unsupplemented milk medium using a two-step and a classical (one-step) fermentation strategy.

The fermentations carried out in unsupplemented milk medium are represented in FIG. 3 (course of pH and living cell numbers) and FIG. 4 (course of EPS and apparent viscosity).

FIG. 3 is a fermentation profile of *Streptococcus thermophilus* LMG P-19262 in unsupplemented milk medium using a two-step and a classical (one-step) fermentation strategy. The fermentations were carried out at a constant temperature of 42° C. and a constant agitation rate of 100 rpm. The pH of the first step of the two-step fermentation process was kept constant at 6.2 through automatic addition of 10 N NaOH. Values of pH, cell number (CFU.ml$^{-1}$) and added NaOH (ml.l$^{-1}$) are displayed. All values linked to the two-step fermentation process are marked with '*'. The vertical line indicates the switch between the first and the second step.

FIG. 4 depicts a fermentation profile of *Streptococcus thermophilus* LMG P-19262 in unsupplemented milk medium using a two-step and a classical (one-step) fermentation strategy. The fermentations were carried out at a constant temperature of 42° C. and a constant agitation rate of 100 rpm. Values of apparent viscosity (mPa·s) and amount of EPS (mg PDM.l$^{-1}$) are displayed. All values linked to the two-step fermentation process are marked with '*'. The vertical line indicates the switch between the first (pH-controlled) and the second (acidification) step.

For both fermentations carried out in enriched milk medium (FIG. 1), the maximum specific growth rates $\mu_{max}$ were calculated as 1.12 h$^{-1}$ ($r^2$=0.930) and 0.84 h$^{-1}$ ($r^2$=0.931) for the pH-controlled part of the two-step fermentation and for the one-step fermentation, respectively. Although a comparable maximum specific growth rate for both fermentation processes, a higher living cell number was obtained for the two-step (pH-controlled) fermentation experiment. For the second part (acidification step) of the two-step fermentation and for the one-step (pH-free) fermentation process, the $r_{max}$ values were calculated as 0.18 h$^{-1}$ ($r^2$=0.999) and 0.21 h$^{-1}$ ($r^2$=0.981), respectively, indicating a parallel course of pH for both fermentation experiments. However, the acidification stopped at a higher pH value for the two-step fermentation experiment as compared to the one-step control fermentation, possibly due to lactose depletion. A delay of almost 5 h was observed for the two-step fermentation process to reach a final pH and a maximum cell number.

Fermentations were also carried out in unsupplemented milk medium, a medium simulating a non-fortified one that may be used for commercial yoghurt Production (FIG. 3). For the first (pH-controlled) part of the two-step fermentation process, bacterial growth was almost linear ($\mu_{max}$=0.14 h$^{-1}$; $r^2$=0.987). For the one-step fermentation, μmax was calculated as 0.17 h$^{-1}$ ($r^2$=0.984); However, a higher living cell number was obtained for the two-step (pH-controlled) fermentation experiment as was already seen in the fermentation with enriched milk medium. It was demonstrated again that the maximum acidification rates were comparable for the second part of the two-step fermentation process and for the one-step fermentation experiment. The rmax values were calculated as 0.01 h$^{-1}$ (r$^2$=0.999) and 0.01 h$^{-1}$ (r$^2$=0.995), respectively.

EPS yields and apparent viscosity (FIG. 2) show a signifcant difference between both fermentation experiments carried out in enriched milk medium. Indeed, while a maximum of 114 mg PDM.l$^{-1}$ and a corresponding apparent viscosity of 3.2 mpa·s was observed for the fermentation experiment with free pH-course, an increased maximum exopolysaccharide yield of 432 mg PDM.l$^{-1}$ and a concomitant apparent viscosity of 5.2 mPa·s was observed for the two-step fermentation process. The maximum exopolysaccharide amounts were clearly stable upon prolonged fermentation. For both experiments, the apparent viscosity of the fermentation medium parallelled the EPS yields. The two-step fermentation process took a few hours more to achieve the increased EPS production level and almost doubled apparent viscosity. Similar observations were made for both fermentations carried out in unsupplemented milk medium (FIG. 4). A maximum of 108 mg PDM.l$^{-1}$ and a corresponding apparent viscosity of 1.9 mPa·s was observed for the fermentation experiment with free pH-course, while an increased maximum EPS yield of 221 mg PDM.l$^{-1}$ and a concomitant apparent viscosity of 4.2 mPa·s was observed for the two-step fermentation process. These increased EPS yields and apparent viscosities were once more at the expense of the time needed to reach the maximum values. As seen for the bacterial growth, an almost doubled fermentation time was needed.

No syneresis was observed upon storage of the fermented (un)supplemented milk using the two-step production process as compared to the one-step fermentation process where clear water separation took place. The two-step fermentation process thus results in a product with a rather high, stable exopolysaccharides content and an almost doubled viscosity.

A deposit has been made on Feb. 18, 2000 according to the Budapest Treaty for the microorganism *Streptococcus thermophilus* IMDO 61001 under deposit number LMG P-19262 at the BCCM/LMG Culture Collection, Laboratorium voor Microbiologie, K. Ledeganckstraat 35, B-9000 Gent (Belgium).

REFERENCES

Beal, C., Skokanova, J., Latrille, E., Martin, N. and G. Corrieu. 1998. Combined effects of culture conditions and storage time on acidification and viscosity of stirred yoghurt. J. Dairy Sci. 82, 673-681.

Cerning, J. and V. M. Marshall. 1999. Exopolysaccharides produced by the dairy lactic acid bacteria. Rec. Res. Dev. Microbiol. 3, 195-209.

Davis, J. G. 1971. Standars for yoghurt. Dairy Ind. 111, 465-472.

Degeest, B. and L. De Vuyst. 1999. Indication that the nitrogen source influences both amount and size of exopolysaccharides produced by *Streptococcus thermophilus* LY03 and modelling of bacterial growth and exopolysaccharide production. Appl. Environ. Microbiol. 65, 2863-2870.

De Vuyst, L., and B. Degeest. 1999. Heteropolysaccharides from lactic acid bacteria. FEMS Microbiol. Rev. 23, 157-177.

De Vuyst, L., F. Vanderveken, S. Van de Ven, and B. Degeest. 1998. Production by and isolation of exopolysaccharides from *Streptococcus thermophilus* grown in a milk medium and evidence for their growth-associated biosynthesis. J. Appl. Microbiol. 84, 1059-1068.

Larsen, R. F. and M. C. Añon. 1989. Effect of water activity a$_w$ of milk on acid production by *Streptococcus thermophilus* and *Lactobacillus bulgaricus*. J. Food Sci. 54, 917-921.

Larsen, R. F. and M. C. Añon. 1990. Effect of water activity of milk upon growth and acid production by mixed cultures of *Streptococcus thermophilus* and *Lactobacillus bulgaricus*. J. Food Sci. 55, 708-710, 800.

Marshall, V. and H. L. Rawson. 1999. Effects of exopolysaccharide-producing strains of thermophilic lactic acid bacteria on the texture of stirred yoghurt. Int. J. Food Sci. Technol. 34, 137-143.

Marth, E. H. and J. L. Steele, Eds. 1998. Applied Dairy Microbiology. Marcel Dekker, Inc., New York, N.Y.

Ricciardi, A. and F. Clementi. 2000. Exopolysaccharides from lactic acid bacteria: structure, production and technological applications. It. J. Food Sci. 12, 23-45.

Rohm, H. 1993. Influence of dry matter fortification on flow properties of yoghurt. 2. Time-dependent behaviour. Milchwissenschaft 48, 614-617.

Walstra, P., Geurts, T. J., Noomen, A., Jellema, A. and M. A. J. S. van Boekel, Eds. 1999. Dairy Technology: Principles of Milk Properties and Processes. Marcel Deker, Inc., New York, N.Y.

The invention claimed is:

1. A method for obtaining yoghurt or other fermented milk products, comprising:
   inoculating a starter medium with a starter culture comprising an exopolysaccharide producing microorganism;
   maintaining a constant pH for at least one hour while culturing the exopolysaccharide producing microorganism in the starter medium at a suitable temperature for producing exopolysaccharide from the starter medium; wherein the culturing increases the exopolysaccharide content of the yoghurt or other fermented milk products as compared to the exopolysaccharide content of the starter medium;
   clotting the starter medium by lowering the pH, thereby obtaining yoghurt or other fermented milk products.

2. The method such as in claim 1 wherein said constant pH value lies between 4.0 and 7.0.

3. The method such as in claim 1 wherein said suitable temperature lies between 15 and 50° C.

4. The method such as in claim 1, wherein the constant pH is maintained by one or more additions of a food-grade base.

5. The method such as in claim 1, wherein said acidification step comprises termination of the pH control, followed by a spontaneous acidification.

6. The method such as in claim 1, wherein said acidification step is performed by addition of a food grade acid.

7. The method such as in claim 1 wherein said starter culture comprises *S. thermophilus* LMG P-19262.

8. The method such as in claim 1, wherein said starter culture comprises a micro-organism selected from the group consisting of any exopolysaccharide producing *S. thermophilus*, *Lb. delbrueckii* subsp. *bulgaricus*, thermophilic lactic acid bacterium, *Lactococcus lactis*, or mesophilic lactic acid bacterium strain or any combination or mutant or recombinant thereof.

9. The method such as in claim 1, wherein said starter medium is milk.

10. The method such as in claim 1, wherein the constant pH value is 6.2 and the suitable temperature is 42° C.

11. The method of claim 2 wherein said constant pH value lies between 5.5 and 6.9.

12. The method of claim 3 wherein said suitable temperature lies between 37 and 44° C.

13. The method of claim 1, wherein the starter medium is cultured at a constant pH until 25 to 50% of lactose of the starter medium is consumed.

14. The method of claim 1, wherein the starter medium is cultured at a constant pH until 50% of lactose in the starter medium is consumed.

15. The method of claim 1, wherein the constant pH is controlled through on line control with automatic addition of a food grade base.

16. The method of claim 2, wherein the final pH reached during acidification is between 4.7 and 4.4.

17. The method of claim 1, wherein lowering the pH comprises
   ceasing maintenance of constant pH of the starter medium, and
   continuing to culture the exopolysaccharide producing microorganism in the starter medium.

* * * * *